June 13, 1967  D. W. COOPER ETAL  3,325,125
PARACHUTES
Filed May 17, 1965
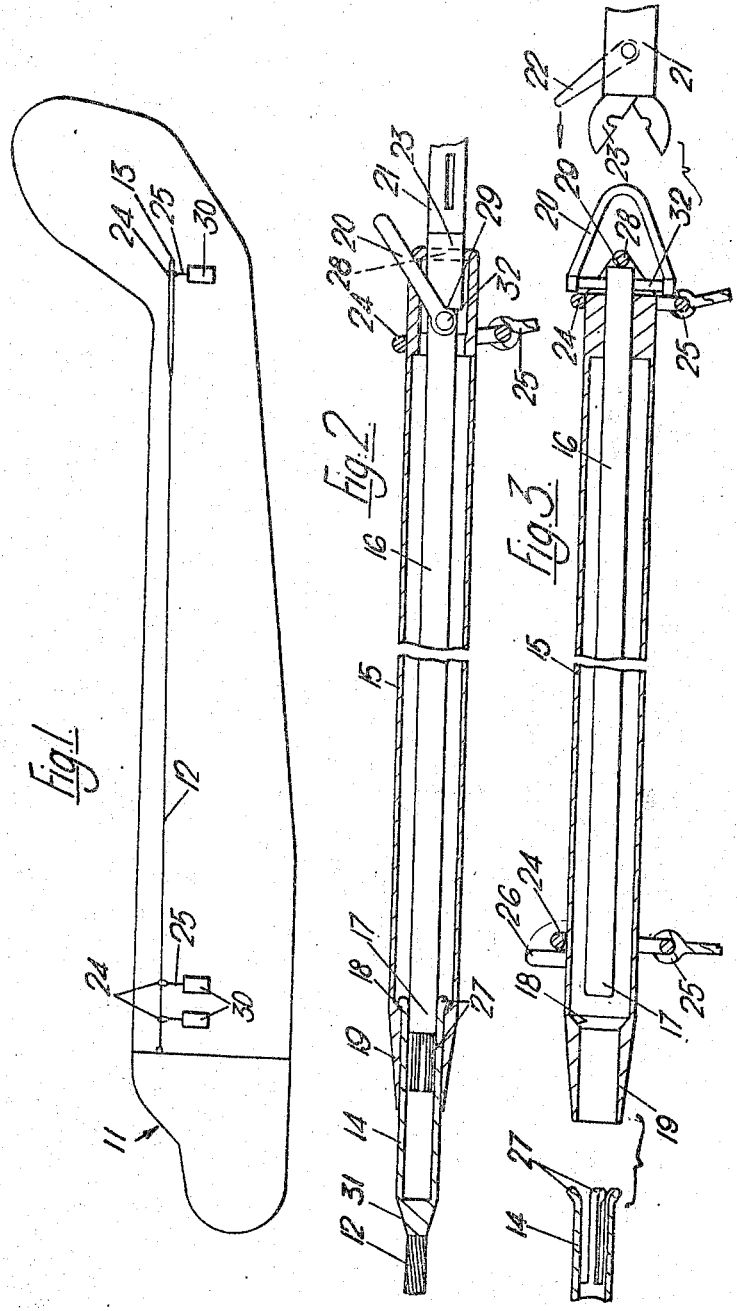
Inventors
DANIEL WAUMSLEY COOPER
JOHN ROTHWELL MITCHELL
By
Shoemaker and Mattare
Attorneys

United States Patent Office 3,325,125
Patented June 13, 1967

3,325,125
PARACHUTES
Daniel Waumsley Cooper and John Rothwell Mitchell, Woking, England, assignors to G. Q. Parachute Company Limited, Surrey, England, a company of Great Britain
Filed May 17, 1965, Ser. No. 456,049
Claims priority, application Great Britain, June 26, 1964, 26,466/64
5 Claims. (Cl. 244—138)

ABSTRACT OF THE DISCLOSURE

Means are provided for releasing the bags and static lines from the cable of an aircraft and collectively parachuting them to earth for recovery. The means includes a tube on which static lines carrying the bags, are threaded and retained. One end of the tube is tapered and axially telescopically receives the rear end of the cable and is secured thereto by a releasable coupling. The other end of the tube is releasably attached to the aircraft and carries both the link to which a parachute is attached and the means for substantially simultaneously releasing the tube from the cable and the aircraft.

---

This invention relates to parachutes and particularly to means for the recovery of the bags in which parachutes are packed.

When loads, such as parachutists or goods, are dropped from an aircraft, the load is usually connected to a parachute which supports the load after it leaves the aircraft. The parachute is usually packed in a bag. The bag is often connected to a static line which is attached to a ring which is arranged to slide on a cable fixed in the aircraft. As the load is being discharged, the ring slides along the cable and, when the load is free of the aircraft, the static line holds the bag while the parachute is dragged from it by the load. When a plurality of loads has been discharged, a number of bags and static lines remain attached to the cable. If further loads are to be discharged, these bags and static lines must be either drawn back into the aircraft and removed from the cable or released from the aircraft. Sometimes the parachute does not leave the bag after the load has left the aircraft. In such a case it is necessary to connect another parachute to the load and to cut the cable so that the unopened or improperly opened bag with the load is freed from the aircraft. If the cable has been cut it is necessary to fit a new cable in the aircraft before the next load or set of loads can be released.

The object of this invention is to enable the bags to be quickly and easily released from the cable and to enable the cable to be quickly restored into its operational state.

This invention comprises a method of releasing a load, such as a group of parachute bags and static lines, from an aircraft in which the load is attached to a cable, rod or similar fixture fitted in the aircraft and in which the said cable, rod, or similar fixture includes a detachable length which is connected to the remainder of the said cable, rod or similar fixture by a releasable coupling, the load, when it is released from the aircraft, taking with it the said detachable length.

This invention also comprises a cable, rod or similar fixture for an aircraft to which the static lines of parachute packs are connected, which includes a detachable length connected to the remainder of the said cable, rod or similar fixture by a releasable coupling, the said detachable length being released from the said remainder by the load on the said detachable length after the release has been initiated.

This invention also comprises a cable, rod or similar fixture for an aircraft to which the static lines of parachute packs are connected which includes a detachable length which is connected to the remainder of the said cable, rod or similar fixture by a releasable coupling and to the aircraft by a release slip, the disconnection of the said detachable length from the said release slip allowing the load on the said detachable length to release the releasable coupling and so free the said detachable length from the said remainder of the said cable, rod, or similar fixture.

The said detachable length may be provided with means for retaining any loads which are on it when the length is released from the aircraft, and may be provided with means to which a parachute can be attached.

The invention also comprises a coupling for connecting a cable or the like to a point consisting of a collet which is rigidly attached to the said cable, a tube into which spring tongues attached to the collet are inserted and which covers a rod the end of which is arranged to hold the collet in the tube, and a release slip attached to the said point which has jaws which engage a pin, held in the walls of the tube, and which, when gripping the said pin, holds the said rod in the position to hold the collet in the said tube.

One form of the invention will now be described with reference to the accompanying drawings of which FIGURE 1 represents an aircraft fitted with this invention, FIGURE 2 is a sectional view of the detachable length of the cable shown in FIGURE 1 when attached to the remainder of the cable and FIGURE 3 is a view of the same detachable length with its release slip and releasable coupling in the released position.

In the description the cable, rod or similar fixture is referred to as a cable 12, the detachable length as a tube 15, and the releasable coupling as coupling 13.

The aircraft 11 from which the loads are to be dropped is provided with a cable 12 on which slide rings 24 attached to static lines 25 connected to bags 30 which hold parachutes. The parachutes are connected by rigging lines to loads such as parachutists or stores not shown in the drawings. The cable 12 terminates in a coupling 13 which is shown in detail in FIGURES 2 and 3.

Rigidly attached to the cable 12 is a collet 14 having a number of spring tongues 27. The spring tongues 27 enter the end of a tube 15 and engage a shoulder 18 which is provided inside the tube 15. The end of the tube 15 is tapered as shown at 19 so that rings 24 slide easily from the cable 12 onto the tube 15. The tube is provided with a latch 26 which is held in the erect position by springs (not shown), the latch 26 being so set that rings 24, passing from the cable 12 onto the tube 15 slide over the latch 26, but rings 24 sliding in the opposite direction from the tube 15 towards the cable 12 are held by the latch 26 as shown in FIGURE 3.

A rod 16 is housed in the tube 15, one end of the rod carrying a pin 32 on which a link 20 is pivoted. A recovery parachute, not shown, is attached to the link 20. The other end of the rod is fashioned as a plug 17 which enters the collet 14 and holds the spring tongues 27 against the shoulder 18 so that the collet 14 cannot be pulled out of the tube 15 while the plug end 17 of the rod 16 is in engagement with the spring tongues 27. The rod 16 is retained in the tube 15 by pin 28 which passes through apertures in the wall of the tube 15.

The rod 16 is kept in its forward position as shown in FIGURE 2 by the release slip 21 which is fixed to the aircraft 11 by means not shown. The release slip 21 has jaws 23, which, when closed, grasp the pin 28. In this closed position the ends of the jaws press against the end 29 of the rod 16 and so hold the rod in the forward position as shown in FIGURE 2. The plug end 17 of the rod is thus held in the collet 14. A lever 22 is provided to open the jaws 23, the lever being operated from a remote position in the aircraft by cables, levers or the like which are not shown in the figures.

In use the coupling is in the position shown in FIGURE 1 and in the condition shown in FIGURE 2. Rings 24 slide along the cable 12 and onto the tube 15 passing the latch 26 which swings down to allow the rings to slide onto the tube and springs back into the erect position as shown in FIGURE 3 as each ring 24 slips off the end of the latch. As each ring 24 slides onto the tube, the load attached to the parachute drops free of the aircraft and the static line 25 holds the bag 30 so that the load can drag the parachute from the bag and allow the load to fall to the ground supported by its parachute.

When it is desired to release a group of bags, the lever 22 is operated so that the jaws 23 open. The weight of the bags on the coupling exerted against the pin 20 carried by rod 16 moves the rod 16 from its locking position shown in FIGURE 2 into its release position shown in FIGURE 3. The rod 16 is now retained in the tube 15 by the pin 28 against which the end 29 of the rod 16 rests. In this position of the rod the plug end 17 is clear of the spring tongues 27 of the collet 14. The tube 15 is pulled away from the collet 14 by the weight of the bags on the tube and the coupling, carrying the rings 24, static lines 25 and bags 30, drops away from the aircraft. The link 20 is attached to a recovery parachute which would normally be housed in a bag attached to the aircraft. The weight of the coupling and bags starts to pull this recovery parachute from its bag, and the resistance holds the link 20 until the coupling has turned so that the end 19 of the tube is lowermost and the rings 24 with their static lines 25 and bags 30 have moved back along the tube 15 and are held on the tube 15 by latch 26. The coupling now drags the recovery parachute from its bag and the coupling, rings, static lines and bags float to earth supported by the recovery parachute.

A new coupling is now attached to the cable 12 by pushing its collet 14 into the tapered end of the tube 15, pushing the rod 16 forward until its end 17 enters the spring tongues 27 of the collet 14, lifting the coupling and inserting the pin 28 between the jaws 23 of the release slip 21 and resetting the lever 22 so that the jaws close and the ends of the jaws press against the end 29 of the rod 16. The cable is then ready for a further group of releases.

If an emergency occurs, such a parachute becoming fixed to its bag, so that the load is not released from the aircraft, an additional parachute, could be attached to the link 20, or the recovery parachute, if it is strong enough, could be used to carry the load to earth. In either case, the load is released from the aircraft by operation of the release lever 22, so that the load takes the detachable coupling with it from the aircraft. The cable is arranged for further use by fitting another coupling as described above.

As shown one spring latch is provided on the tube 15, but a number of latches could be provided which could be distributed around the circumference of the tube, preferably in the same plane, if one latch is not strong enough to carry the weight of the rings and bags.

Instead of a cable 12, a rod, chain, a series of linked rods or any similar fixture could be used. The detachable section 15 could be rigid, as shown, or flexible without departing from the invention.

Having described our invention, what we claim as new and desire to secure by Letters Patent is:

1. In an aircraft fitted with a cable for holding a plurality of static lines connected to parachute bags, said cable having a detachable length on which said lines are retained, one end of said detachable length having means for releasably coupling it to one end of the cable and the other end having means for releasably hitching it to the aircraft, and manually controlled means for substantially simultaneously releasing both ends of said detachable length.

2. An aircraft as claimed in claim 1, in which the detachable length consists of a tube which encloses an axially shiftable rod, said tube having a transversely extending pin in one end, said hitch comprising releasable jaws received by said pin, and said releasable coupling comprising a collet rigidly attached to one end of said cable and received in the other end of said tube, said received end having spring tongues pressed outwardly by one end of said rod to provide a rigid connection between the collet and tube.

3. An aircraft as claimed in claim 2, in which said hitch when in unreleased position contacts the other end of said rod and prevents axial shifting thereof.

4. An aircraft as claimed in claim 3, in which the spring tongues engage a shoulder inside the tube.

5. An aircraft as claimed in claim 4, in which the tube carries link means to which a parachute may be attached.

References Cited

UNITED STATES PATENTS 2,994,497   8/1961   Hoffacker et al. _____ 244—149

MILTON BUCHLER, *Primary Examiner.*

ALFRED E. CORRIGAN, *Examiner.*